Nov. 13, 1951 B. AGNEW 2,574,809
DIRECTIONAL CONTROL VALVE FOR WATER SOFTENERS
Filed March 28, 1949 9 Sheets-Sheet 1

INVENTOR.
Boyd Agnew
BY

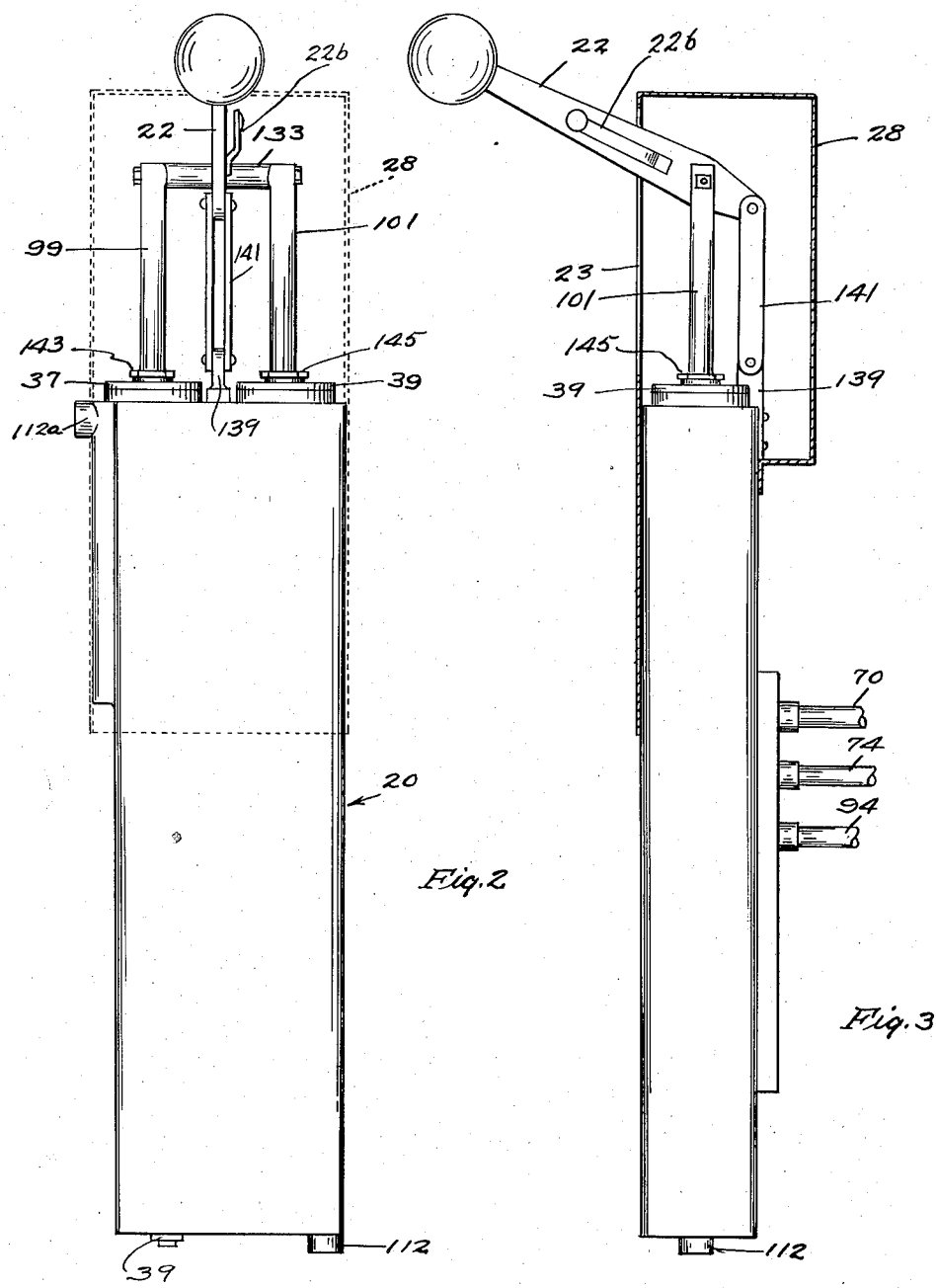

Nov. 13, 1951  B. AGNEW  2,574,809
DIRECTIONAL CONTROL VALVE FOR WATER SOFTENERS
Filed March 28, 1949  9 Sheets-Sheet 7

INVENTOR.
Boyd Agnew
BY
HIS ATTY

Nov. 13, 1951  B. AGNEW  2,574,809
DIRECTIONAL CONTROL VALVE FOR WATER SOFTENERS
Filed March 28, 1949  9 Sheets-Sheet 8

INVENTOR.
Boyd Agnew
BY

Nov. 13, 1951 B. AGNEW 2,574,809
DIRECTIONAL CONTROL VALVE FOR WATER SOFTENERS
Filed March 28, 1949 9 Sheets-Sheet 9

INVENTOR.
Boyd Agnew
BY

Patented Nov. 13, 1951

2,574,809

UNITED STATES PATENT OFFICE 2,574,809

DIRECTIONAL CONTROL VALVE FOR WATER SOFTENERS

Boyd Agnew, Los Angeles, Calif., assignor to Anthony Higgins, Pasadena, Calif.

Application March 28, 1949, Serial No. 83,968

6 Claims. (Cl. 277—12)

The valve of this invention, as would be indicated by the title, is primarily adapted for use, in connection with water-softening systems, as a means to control the directional flow of water therethrough to facilitate periodic re-conditioning thereof, yet maintain a water supply service to the place of use while the unit is being re-conditioned.

The service to which the valve of this invention is related is usually provided with a number of separate valves to meet the conditions imposed in servicing a water-softening unit, whereas, and in contra-distinction to which practice, the valve of this invention combines in a simple, practical and novel unit all of the flow control means heretofore present and represented by a plural number of individual valve units, and this feature of the valve is to be considered as being one of the several objects thereof.

A further object of the invention is the provision of a valve of extreme structural simplicity and arrangement of valve elements whereby upon the simple act of raising or lowering a manual control the valve may be moved to cut-off and cut-in each of the several conduits through which water must flow in switching from a normal soft-water service to that of re-conditioning the unit and yet maintain a water supply service to the consumer.

A still further object of the invention is to provide a valve of the character contemplated which is compact and neat in appearance, a valve which is readily accessible for repair and/or part replacement as a result of wear to which any valve is subject in time.

The preceding and other objects and advantages of the invention may appear from a study of the accompanying drawing, the detailed description and the sub-joined claims.

In the drawing:

Figure 2 is a similar view modified to the extent of removal of the covering shield or bonnet thereof; while, Figure 3 is a side-elevational view thereof, in which the covering bonnet is shown in mid-section.

Figure 8:
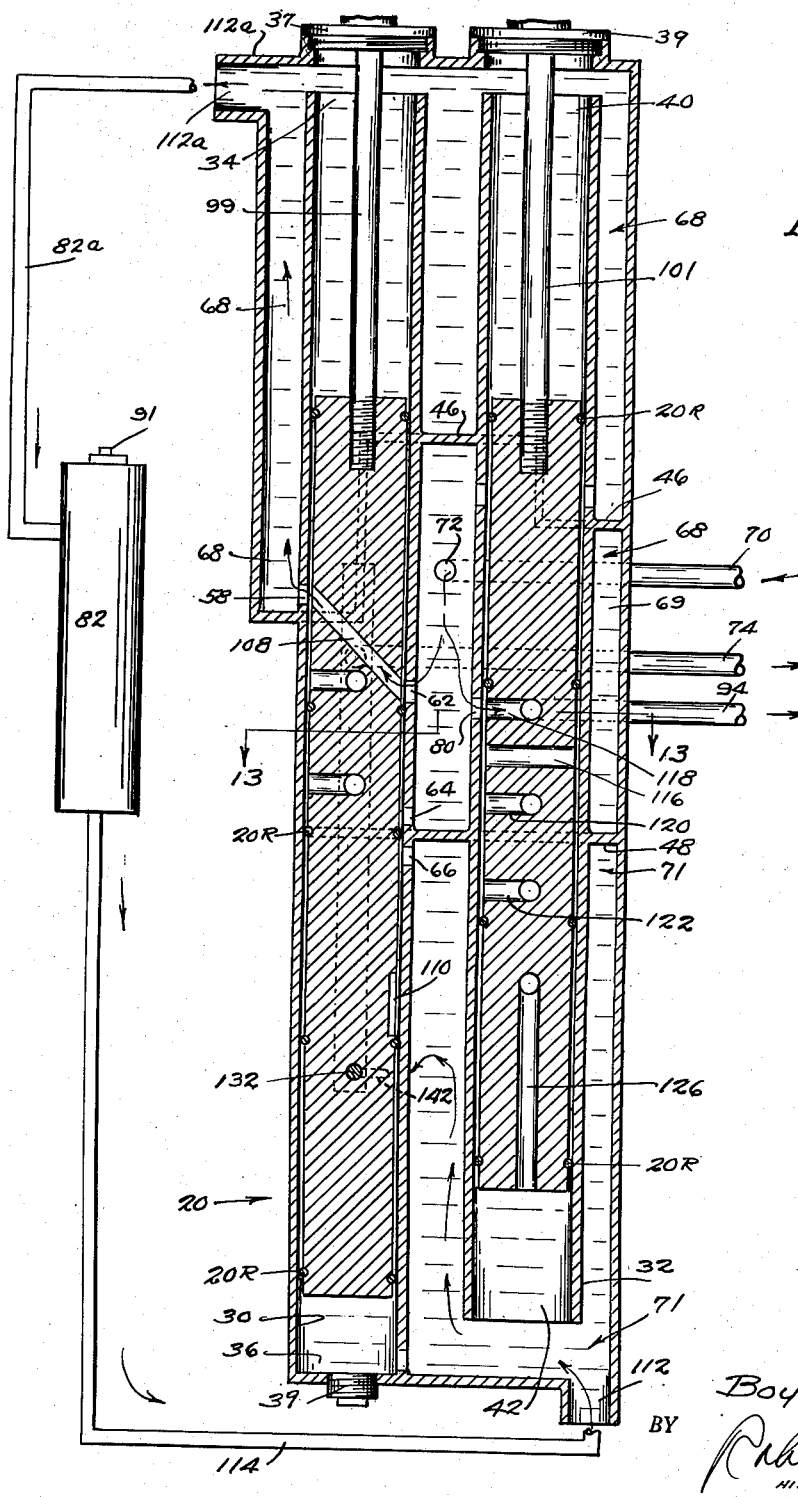

Figure 8 is a view designed to show the valve elements moved to admit water to the softening unit after salt has been added, the brine from the unit returning to the valve and flowing therefrom at a controlled rate of flow whereby the salting operation is carried out over a sufficient period of time to effect de-calcification of the softening agent in the unit. During this period of time normal tap water service is maintained to the user.

Figure 7:
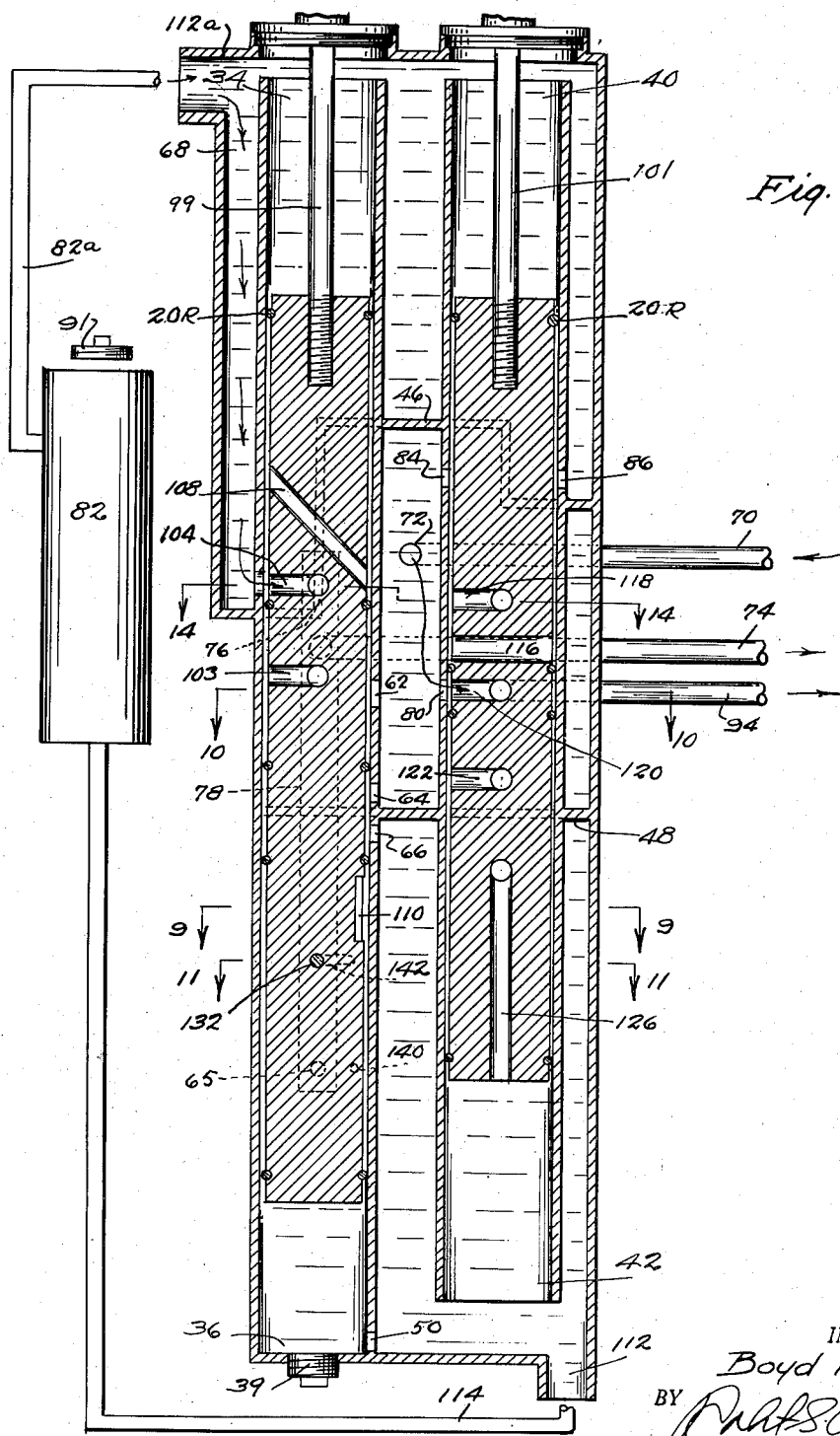
Figure 7 is a view generally similar to Figures 5 and 6, except that here the valves are shown in position to maintain water service to the user, as in Figure 6, while concurrently shutting off water to the softening unit to permit opening thereof for adding salt for re-conditioning, and at the same time accommodating displaced or over-flow water from the unit to a place of disposal.
Figure 9:
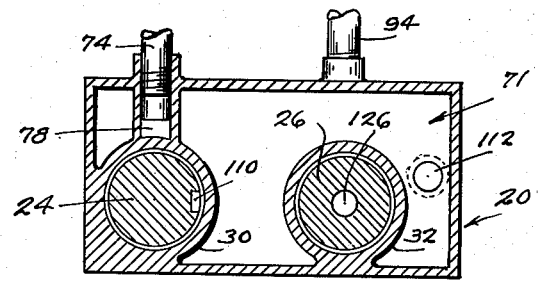
Figure 10:
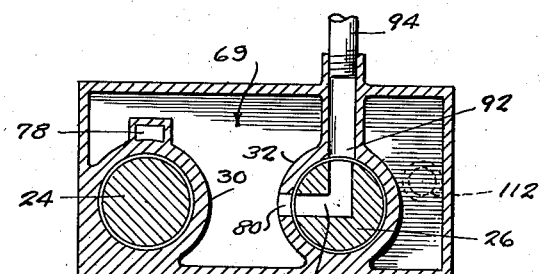

Figures 9 and 10 are transverse sectional views taken on lines 9—9 and 10—10 respectively on Figure 7, showing construction and disposition of structural elements of the valve.

Figure 11:
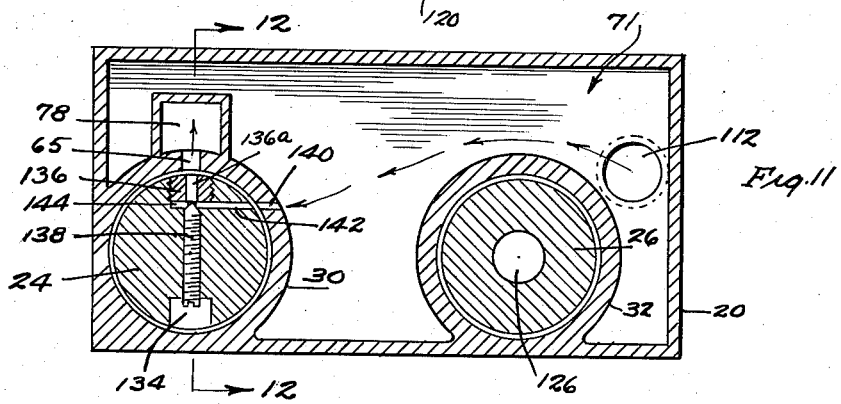

Figure 11 is also a transverse sectional view, being taken on line 11—11, Figure 7, and is adapted to show a preferred form of regulation of the flow of salt brine during the period of decalcification of zeolite in the tank of the unit.

Figure 12:
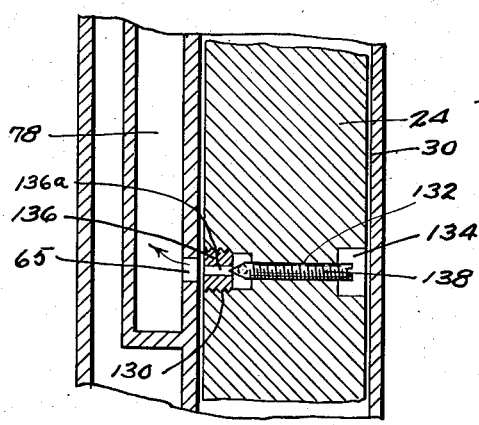

Figure 12 is a detail taken substantially along line 12—12, Figure 11, showing other elements of construction involved in the valve, but not clearly shown in Figure 11.

Figure 1:
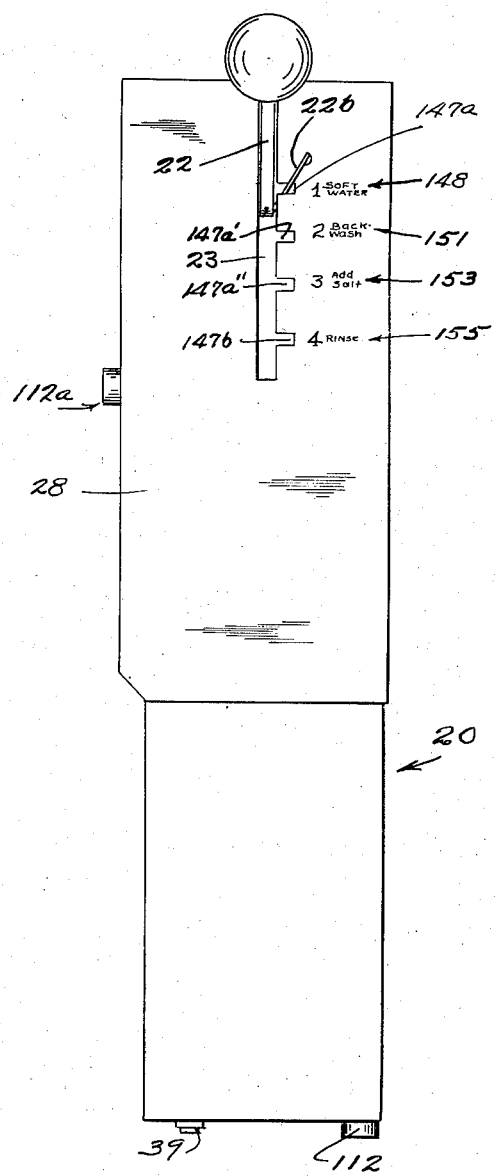
Figure 1 is a front elevational view showing the valve of this invention.
Figure 4:
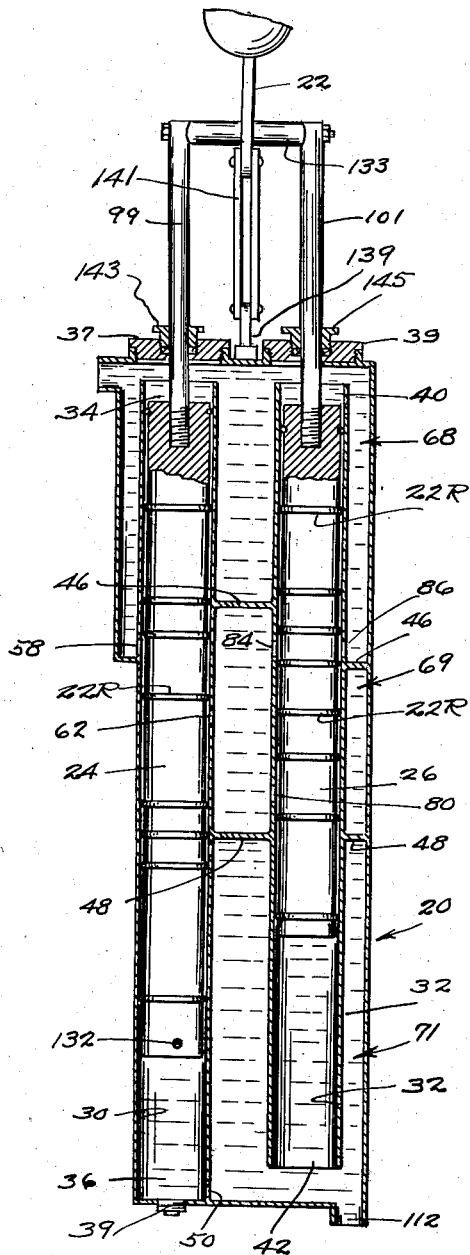
Figure 4 is a sectional view through the valve body showing the valve elements principally in elevation, the view is designed to show general structure, the valve operating means, and includes certain of the seals used to avoid loss of water.
Figure 5:
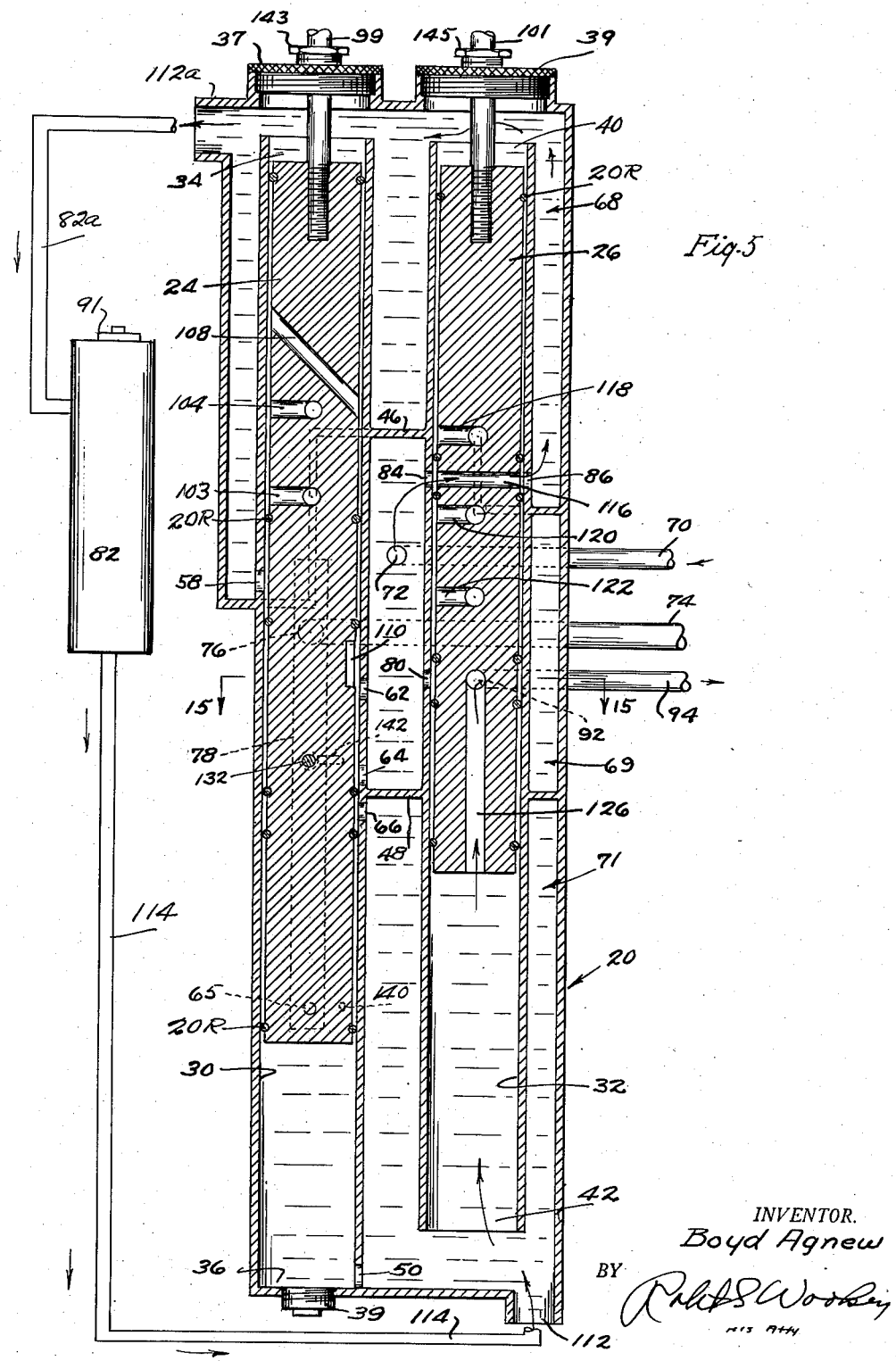
Figure 5 is a mid-vertical sectional view showing the valve parts in such position as will effect normal soft-water service to a user, in this view, as well as in certain others of the valve the tank is merely shown schematically in relationship thereto.
Figure 6:
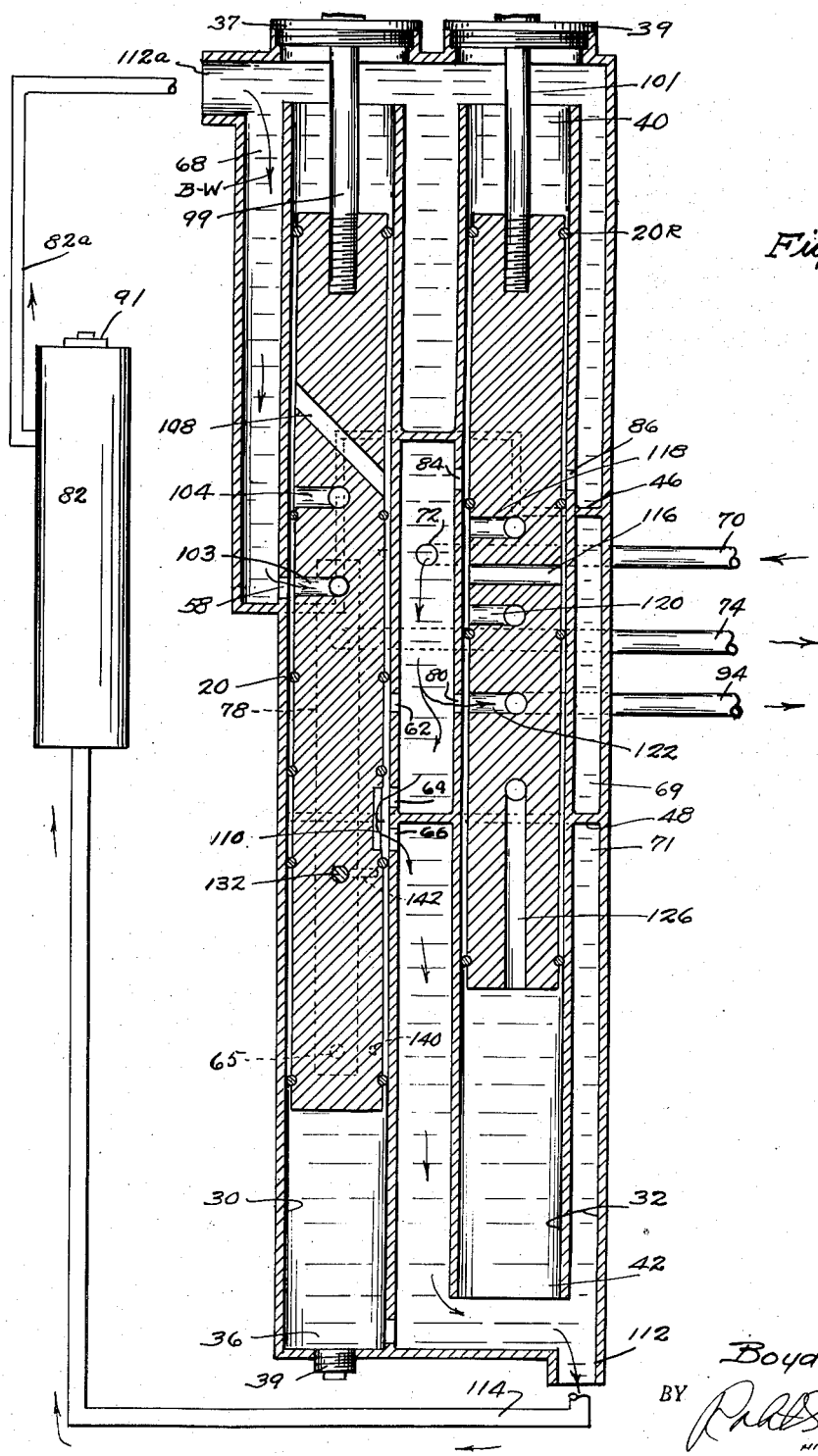
Figure 6 is a view of the valve showing the position of the parts to admit water reversely through the softening unit to flush removable matter therefrom and to re-arrange the gravel and zeolite in the unit by back-washing.
Figure 13:
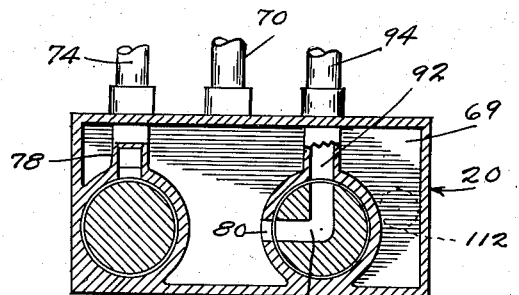
Figure 14:
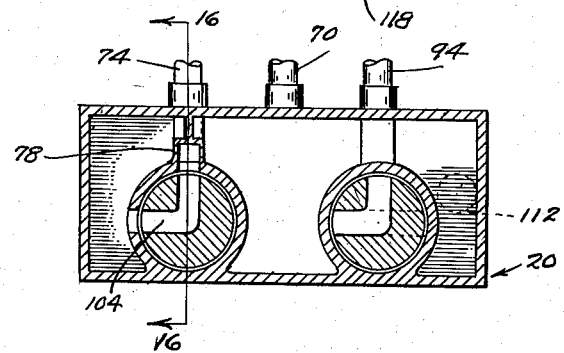
Figure 15:
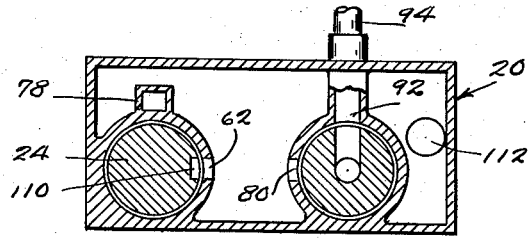
Figure 16:
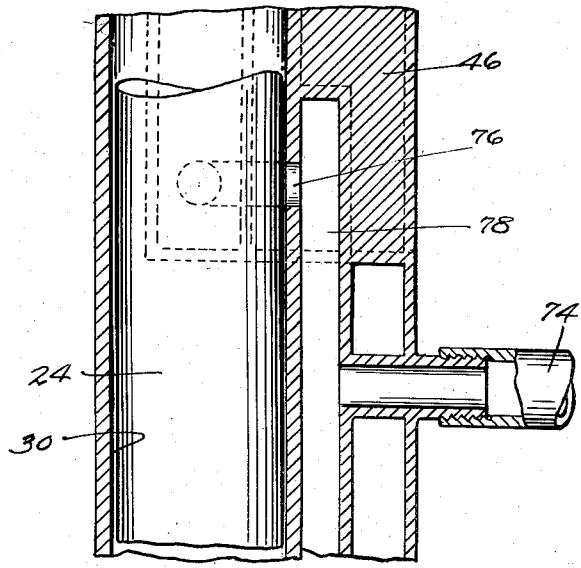

Figures 13, 14 and 15 are sectional views showing further detail of construction as seen along line 13—13 in Figure 8, line 14—14 in Figure 7, and line 15—15 in Figure 5 respectively; and, Figure 16 is a sectional view as seen along line 16—16 in Figure 14, showing detailed structure connected with the over-flow to a waste pipe.

In the text of the following specification of the valve of this invention, the physical structure thereof will be set forth first and thereafter the operation of the valve through each of its several successive functional positions will be set forth, which positions may be stated as being; first, normal, that is, the valve is positioned to supply soft water to the user; second, back-wash to flush loose matter from the softening unit and to re-arrange the previously packed gravel within the unit; third, cutting off water to the unit as a step prior to opening thereof for adding salt and concurrently draining away such overflow water as may be displaced by the added salt; and fourth, admitting water to the softening unit to form a brine and controling the rate of flow of the brine from the unit over a sufficient period of time to complete the de-calcifying process.

As shown in the drawing, the reference character 20 indicates the body of the valve which is shown as being substantially rectangular in exterior configuration. A manually operated lever 22 which is vertically movable through an elongated slot 23 in the box-like cover or bonnet 28 is adapted to move the valve elements concurrently to their several functional positions in the order above referred to or to any variation thereof, as will be more fully described as the text of the specification is developed.

Within the structure 20 and preferably cast integral therewith, I form the elongated cylinders 30 and 32, and of these, the cylinder 30 is formed with an open upper end 34 and a closed lower end 36, and the cylinder 32 is formed with an open upper end 40 and an open lower end 42, while a screw plug 39 permits access to the bottom of the cylinder 30 for removal of sediment and the like or for such other reason as may be at hand.

The cylinders 30 and 32 are integral with the structure 20 and are further strengthened with respect to the valve body by means of integral webbings 46 and 48 which extend transversely of the cavity within the body 20 so that the interior thereof is divided into chambers 68, 69 and 71 to facilitate, and in fact directly serve in directional control of water flowing through selected ports within the valve structure.

Reference to Figures 5, 6, 7 and 8, will show that the cylinder 30 is provided with a port 50 in the lower end thereof so that water may ebb and flow therethrough in response to movement of the piston operating therein.

The cylinder 30 is additionally provided with ports 58, 62, 64 and 66 extending through the sides thereof in communication with the chambers or water compartments 68, 69 and 71 which are always flooded with water entering through the pipe 70 and the port 72 in the rear of the valve body. The cylinder 30 is additionally in communication with a waste fluid pipe 74 by means of a port 76 in communication with an elongated passageway 78 formed integral therewith. A port 65 also extends through the wall of the cylinder 30 and is in communication with the passageway 78 whereby salt water from the softener unit 82 may be vented to a sewer or other place of disposal through the aforementioned pipe 74.

The cylinder 32 is provided with the ports 84 and 86 which are oppositely disposed with respect to one another through the walls thereof, and further, the cylinder 32 is formed with the port 80 and the port 92, the latter being in communication with the pipe 94 which leads to the consumer's service and is adapted to conduct soft or hard water thereto as will hereinafter be more fully set forth.

A passageway 108 positioned in the upper one-half of the piston 24 extends diagonally thereacross and is adapted to be brought into registry with the ports 58 and 62 for functional use, while an elongated slot 110 formed in the side of the piston is adapted to be brought into registry with the ports 64 and 66 as a by-pass for water flowing from the port 72 directly to the port 112 in the bottom of the valve body 20, and serves as a means for conducting water to the unit 82 through the intermediate pipe 114 during the back-washing operation or operational step number two.

The piston 24 as shown in Figures 11 and 12 is formed with a plural number of bores 130, 132 and 134, and of these bores, bore 130 is adapted to receive an apertured insert 136 in medial horizontal alignment with a needle valve 138 in the bore 132, while the bore 134 constitutes a recess for the slotted end of the needle valve whereby the part 138 is entirely within the body of the piston in clearance of the walls of the cylinder 30, and whereby access may be had thereto for adjustment of the valve to vary the rate of flow of salt brine therethrough in passing from the chamber 71 through the port 140 and the passageway 142 to the annular chamber 144 between the inner end of the insert 136 and the adjacent end of the needle valve 138.

The piston or valve 26 which is operable within the cylinder 32 is provided with a transversely extending passageway 116 which is adapted to be brought into registry with the ports 84 and 86 for functional use, while the transversely directed L-shaped passageways 118, 120, and 122 are each adapted to be selectively brought into registry with the ports 80 and 92. Another L-shaped passageway 126 is formed in the valve 26 and is shown having a free open end terminating in coincidence with the lower end thereof, and is adapted to have the other of the ends thereof brought into registry with the port 92 for functional use as will hereinafter be more particularly pointed out.

Reference has previously been made to the screw caps 37 and 39 as serving to permit access to the interior of the valve housing 20 for servicing and other purposes. As will be noted in the drawing, these caps or plugs are bored vertically through their medial longitudinal axis to receive tubular extensions 99 and 101, the one end of each of which is threadedly united or screwed into the valves 24 and 26, while the other of the ends thereof are connected by a bridging member 133 which serves as a point of attachment of the work, as represented by the part 99 and valve 24, and the part 101 and valve 26, to the hand lever 22, which in turn is suitably fulcrumed to a bracket 139 by means of an intervening swivel link 141. Glands 143 and 145 are adapted to seal the bores in the plugs 37 and 39 through which the parts 99 and 101 move in response to movement of the lever 22, and hence serve to prevent leakage at these points.

The valve operating assembly afore-mentioned is contained within a suitable bonnet 28 attached to the valve housing 20, and in facilitation of operation of the valve is provided with indicia for each of the functional positions of the valve, and with recessed stops for a finger pressed spring latch 22b to hold the lever 22 in any given operational position, thus notation 148 indicates the position in which the lever 22 remains when the unit is delivering soft water. Notation 151 indicates the position of the lever (valve) when water is reversely moved through the unit for back-washing to cause a lifting and in general, a rearrangement of the zeolite particles prior to the next normal use of the softening unit, thereby washing out free matter and so loosening the bedded gravel as to permit a free flow of water therethrough. Notation 153 indicates the valve position adapted to cut-off water to permit opening the unit for adding salt and concurrently permitting excess or overflow water to find its way through the valve to a place of disposal.

Notation 155 serves to indicate the position of the valve during the rinsing period, that is, the period during which the zeolite is subjected to a brine bath to effect de-calcification thereof and during which salt brine flows under regulation therefrom so as to vary the de-calcifiying action to obtain the most efficient result therefrom.

Having thus described the physical structure of my valve, I will now describe the operation thereof based upon the assumption that even though in operation, the efficiency of the unit has dropped because of deposited calcium upon the zeolite within the tank 82, and that because of this condition it is now necessary to effect reconditioning of the zeolite to restore normal efficiency of operation.

To recondition the zeolite, the first step is to manually shift the lever 22 from the indicia 148 to point 151 opposite the words back-wash and at the same time releasing the latch 22b to rest within recess 147a'. This movement shifts the pistons 24 and 26 within the cylinders 30 and 32 and moves the passage-way 116 downwardly and out of register with the ports 84 and 86 and at the same time places the L shaped transversely directed passage-way 122 in register with the ports 80 and 92 so that water entering chamber 69 from the inlet port 72 and pipe 70 will flow through pipe 94 to the user's service, thereby supplying tap water to the user while the softening unit is temporarily out of service. At the same time the by-pass 110 is caused to register with ports 64 and 66 so that water will now flow from chamber 69 to chamber 71 and through port 112 and pipe 114 to the unit 82, wherein the gravel content is raised under inflowing water pressure and is re-arranged to alleviate an otherwise packed condition and at the same time flushing such loose matter as may be present out through the pipe 82a, the port 112a and into the valve chamber 68 in the course indicated by the arrows "B—W" to enter port 58 and the passage-way 103 to waste through port 76 to the passage-way 78 and thence to the waste pipe 74. After a predetermined amount of back-washing, the lever 22 is moved to point to indicia 153 and the latch 22b is set in recess 147a" to effect movement of the valves 24 and 26 to a position in which water flows to the consumer's use but is cut-off from the unit 82. Reference to Figure 7 will show that passage-way 120 is now aligned with ports 80 and 92 so that water service through pipe 94 is maintained to the consumer, while water to the unit 82 has been cut-off since the by-pass 110 is out of register with ports 64 and 66 and water supply through passage-way 116 has also been cut-off, accordingly it is now possible to remove a suitable screw plug 91 from the unit 82 and add a prescribed amount of salt thereto for de-calcifying purposes. Displaced water will flow through pipe 82a, port 112a to chamber 68, then flow through passage-way 104 which is now in register with port 76 and thence through passageway 78 to the waste pipe 74. Upon completion of the operation of placing salt in the unit 82, the manual control lever 22 is moved down to point 155 and the spring latch 22b is set in the recess 147b for the duration of the period required to slowly permit the salt brine resulting from the previous operation to flow to waste.

This last stated movement of the lever 22 carries the piston valves to the position shown in Figure 8, where it will be noted that passage-way 118 is now aligned with ports 80 and 92 so as to continue consumer service with normal tap water, while at the same time passage-way 108 is aligned with ports 58 and 62 so that water will flow from port 72 and chamber 69, through port 62, passage-way 108 and port 58 to the chamber 68, thence through port 112a and pipe 82a to the unit 82, through pipe 114 and port 112 to chamber 71, thence through port 140 (Figure 11) through passage-way 142 to the annular chamber 144, past the adjustable needle valve 138, through the aperture 136a in the threaded insert 136 and through port 65 to the vertical passage-way 78 and to waste through pipe 74. After completion of the afore-described salting and rinsing operation, the valves may be permitted to remain in this position for a short period of time during which fresh water entering the tank or unit 82 will carry away all residual quantities of brine, upon attainment of which condition the lever (valves) are returned to the point of beginning, whereby incoming water flowing through inlet port 72 and entering chamber 69 will flow through ports 84 and 86 including passage-way 116 to chamber 68, through port 112a, pipe 82a, the water-softening unit 82, pipe 114, port 112 and entering the lower end 42 of the cylinder or valve seat 32 will enter the vertically disposed passage-way 126 and flowing through port 92 will enter the consumer's service through pipe 94. The water thus delivered is soft and is filtered free of the usual minute organisms found in tap water.

The preceding matter is completely descriptive of the structural features and operation of the valve of this invention, however, attention is now directed to the sealing rings 26r which are preferably of the so-called O type. In the drawing only those rings are shown which are concerned with sealing the valve with reference to any given functional position, accordingly it will be recognized that in any given position of the valve, the rings required to seal the other positions thereof would also be present in practice, but for the sake of simplicity and to avoid needless duplication, only the sealing rings immediately concerned have been shown.

The valve herein shown and described is simple in structure and practical in operation and with respect to known valve structures is believed to possess patentable novelty. In the operation and use of water-softeners, the most perplexing item is the valve's operation through its successive positions to obtain complete decalcification of the softening agent which is usually zeolite, however, with the present valve no perplexing sequence of action is involved, for the valve is actuated to each required position by merely pulling downwardly upon the manual lever 22 with pauses at each of the indicated positions and is thereafter returned to its point of beginning with a full movement from lower to uppermost position.

Having thus described my invention in its presently preferred form, that which I consider to be novel and for which I seek Letters Patent, is:

I claim:

1. In a valve including a body structure therefor, a pair of cylinders in said body structure, one of said cylinders having unrestricted open ends, the other of said cylinders having an unrestricted open end and a ported end, a piston in each of said cylinders, a waste fluid passageway longitudinally disposed with respect to one of said cylinders and in ported communication therewith, and other ports in said cylinder, ports in said pistons said last mentioned ports being adapted to be selectively brought into registry with ports in said cylinders, and manual control means adapted to actuate said pistons synchronously and longitudinally of said cylinders whereby selected ones of said ports are brought into registry for functional use.

2. In a valve including a housing structure formed with an upper and a lower chamber and an intermediate chamber extending transversely thereof, a pair of cylinders longitudinally disposed within said housing and substantially traversing said chambers and in end communication with said upper and said lower chambers, a waste fluid passage-way adapted to be in ported communication with said upper and lower chambers, a constant water supply service to said intermediate chamber, and other ports in said cylinders in communication with certain of said chambers, a piston in each of said cylinders, ports in said pistons, one of said last mentioned ports being formed with a passage-way terminating in an end of one of said pistons and all of said last mentioned ports being adapted to selected register with selected ports in said cylinders so as to enable fluid to be controllably directed to and from all of said chambers, and manual control means for said pistons.

3. In a valve, a valve housing having a plural number of super-imposed separated chambers therein, a pair of cylinders longitudinally disposed in said housing and substantially traversing said chambers, one of said cylinders having unrestricted open termination in an upper and a lower one of said chambers, the other of said cylinders having an unrestricted open end terminating in said upper chamber and being in ported communication with said lower chamber, a waste fluid passage-way extending lengthwise of one of said cylinders and in ported communication with the chambers in the ends of said housing and a waste fluid drain pipe, and other ports in said cylinders, certain of said last mentioned ports being terminal in certain of said chambers, a piston in each of said cylinders, ports in said pistons, one of said pistons having a ported, longitudinally disposed passage-way terminal in an end thereof positionally adjacent the open end of the associated cylinder and being selectively registerable with a user's service, and other ports in said pistons, said last mentioned ports being selectively registerable with certain of the ports in said cylinders, an incoming fluid service in constant communication with one of said chambers, and manual control means adapted to move both of said pistons, said manual control means being so arranged and constructed as to cause selected ports in said pistons to register with selected ports in said cylinders so as to directionally control flow of fluid passing through said valve.

4. In a valve for a water-softener unit, a partitioned housing structure having end chambers and a middle chamber therein, cylinders in said housing, said cylinders being disposed longitudinally of said housing and extending through said middle chamber and having the ends thereof in terminal communication with said end chambers, said middle chamber being in constant communication with a water supply service, and said end chambers being in open communication with said water-softener unit and being adapted to alternately supply and receive water to and from said water-softener unit, ports in said cylinders, certain of said ports being terminal in certain of said chambers and others of said ports being in communication with a waste fluid passage-way longitudinally disposed on one of said cylinders, a piston in each of said cylinders, ports in said pistons, said last mentioned ports being registerable with certain selected ones of the ports in said cylinders whereby upon movement thereof water is in constant supply to said user's service and selectively directed to said water-softener unit for processing and disposal, and manual control means adapted to actuate said pistons for functional use.

5. In a directional control valve for a water-softening unit, a housing structure having end chambers and a middle chamber, longitudinally disposed cylinders in said housing extending through said middle chamber and being terminal in said end chambers, said middle chamber being in open communication with a water supply service and said end chambers being adapted to alternately supply and receive water with respect to said unit, said cylinders having upper open end in one of said end chambers and having opposite end portions in communication with the other of said end chambers whereby water may flow to and from both of the ends of said cylinders, a waste fluid passage-way longitudinally disposed upon one of said cylinders, and ports in said cylinders, certain of said ports being terminal in said end chambers and said waste passage-way and certain thereof being terminal with said middle chamber, a piston in each of said cylinders, ports in said pistons, said piston ports being registerable with certain selected ones of the ports in said cylinder whereby upon actuation of said pistons water is in constant supply to a consumer's service and is directed to said water-softening unit for processing and disposal, and manual means adapted to actuate said pistons in functional use, said last mentioned means comprising a stud secured to each of said pistons and extending vertically through said housing and including a bridging element secured to the outer ends of each thereof and a handle hingedly connected to said bridging element and fulcrumed upon links on said housing structure.

6. In a pressure valve adapted to direct surging water from a supply source through a water softener unit to waste thereof, a valve housing having an upper and a lower reverse flow port adapted to be connected with said water softener unit, said valve housing having an upper and a lower and an intermediate chamber tri-secting the structure, a first cylinder and a second cylinder in said housing having ends in open fluid pressure connection with said upper chamber and said lower chamber, a first piston and a second piston respectively operable in said first and second cylinders, an elongated waste water conduit communicating with said first cylinder, a reverse flow conduit connecting the upper reverse flow port and adapted to be connected with said waste conduit, a fresh water supply port communicating with said intermediate chamber, a consumer water supply port communicating with said second cylinder and a waste water port communicating with said waste conduit, ports in each of said cylinders and ports in each of said pistons, and manual control means to actuate said pistons lineally in said cylinders, the ports in said cylinders and the ports in said pistons being so constructed and so arranged as to maintain a constant water flow to a consumer service and concurrently surge and reversely surge water through said softener unit upon manual manipulation of said pistons.

BOYD AGNEW.

REFERENCES CITED

The following references are of record in the file of this patent:

UNITED STATES PATENTS

| Number | Name | Date |
|---|---|---|
| 1,704,559 | Miller | Mar. 12, 1929 |
| 1,751,061 | Beert | Mar. 18, 1930 |
| 2,101,025 | Hunt | Dec. 7, 1937 |